US009460213B2

(12) United States Patent
Boldyrev et al.

(10) Patent No.: US 9,460,213 B2
(45) Date of Patent: Oct. 4, 2016

(54) METHOD AND APPARATUS FOR DETERMINING SEARCH RESULTS BASED ON FILTERED INFORMATION

(75) Inventors: Sergey Boldyrev, Söderkulla (FI); Marco Paglia, San Francisco, CA (US); Ian Justin Oliver, Söderkulla (FI); Mika Juhani Mannermaa, Burlington, MA (US); Justin Oppelaar, Ridgefield, CT (US)

(73) Assignee: NOKIA TECHNOLOGIES OY, Espoo (FI)

( * ) Notice: Subject to any disclaimer, the term of this patent is extended or adjusted under 35 U.S.C. 154(b) by 823 days.

(21) Appl. No.: 12/890,282

(22) Filed: Sep. 24, 2010

(65) Prior Publication Data

US 2012/0078882 A1    Mar. 29, 2012

(51) Int. Cl.
*G06F 17/30*    (2006.01)

(52) U.S. Cl.
CPC ... *G06F 17/30867* (2013.01); *G06F 17/30699* (2013.01)

(58) Field of Classification Search
USPC .......... 707/713, 732, 734, 759, 765
See application file for complete search history.

(56) References Cited

U.S. PATENT DOCUMENTS

| | | | |
|---|---|---|---|
| 7,293,017 B2 | 11/2007 | Hurst et al. | |
| 7,769,767 B2 | 8/2010 | Petersen | |
| 8,055,673 B2 * | 11/2011 | Churchill et al. | 707/767 |
| 8,122,021 B2 * | 2/2012 | White et al. | 707/734 |
| 2008/0005071 A1 | 1/2008 | Flake et al. | |
| 2008/0288573 A1 | 11/2008 | Bellotti et al. | |
| 2009/0216749 A1 | 8/2009 | Hardt | |
| 2009/0282144 A1 | 11/2009 | Sherrets et al. | |
| 2009/0307310 A1 | 12/2009 | Kim et al. | |
| 2010/0082434 A1 | 4/2010 | Chen et al. | |
| 2010/0125569 A1 * | 5/2010 | Nair et al. | 707/722 |
| 2010/0318551 A1 * | 12/2010 | Lai | 707/765 |
| 2011/0035329 A1 * | 2/2011 | Delli Santi et al. | 705/347 |
| 2011/0072010 A1 | 3/2011 | Wu et al. | |
| 2011/0103699 A1 | 5/2011 | Ke et al. | |
| 2011/0137902 A1 * | 6/2011 | Wable et al. | 707/737 |
| 2011/0179024 A1 * | 7/2011 | Stiver et al. | 707/728 |
| 2011/0196855 A1 * | 8/2011 | Wable et al. | 707/711 |
| 2011/0213785 A1 * | 9/2011 | Kristiansson et al. | 707/748 |
| 2011/0246456 A1 * | 10/2011 | Weitz | G06F 17/30864 707/724 |
| 2012/0023085 A1 * | 1/2012 | Bellerive et al. | 707/706 |

(Continued)

FOREIGN PATENT DOCUMENTS

WO    WO 2011/030134 A2    3/2011

OTHER PUBLICATIONS

U.S. Appl. No. 12/571,575, filed Oct. 1, 2009, Sergey Boldyrev et al.

(Continued)

*Primary Examiner* — Taelor Kim
*Assistant Examiner* — Christopher J Raab
(74) *Attorney, Agent, or Firm* — Ditthavong & Steiner, P.C.

(57) ABSTRACT

An approach is provided for determining results based on filtered information. A context request is detected from one or more programs. Another program determines to filter the content request, the one or more programs, or a combination thereof. One or more results of the content request are determined based, at least in part, on the filtered content request, the filtered one or more programs, or a combination thereof.

10 Claims, 12 Drawing Sheets

(56) References Cited

U.S. PATENT DOCUMENTS

2012/0030227 A1* 2/2012 Mital et al. .................. 707/767
2012/0102050 A1* 4/2012 Button et al. ................ 707/749

OTHER PUBLICATIONS

U.S. Appl. No. 12/813,248, filed Sep. 10, 2010, Sergey Boldyrev et al.

Dynamic, Localised Space Based Semantic Webs. Oliver et al., WWW/Internet Conference, Freiburg, Germany, 2008, pp. 1-12.

Information spaces as a basis for personalising the semantic web, Oliver, Ian, 11th International Conference on Enterprise Information Systems, May 2009, pp. 1-6.

Personal Semantic Web Through a Space Based Computing Environment, Oliver, et al. Middleware for Semantic Web 08 at ICSC'08, Santa Clara, CA, USA 2008, pp. 1-14.

Process Migration, Milogicic et al., Dec. 5, 1998, pp. 1-24. Accessed: http://www.hpl.hp.com/techreports/1999/HPL-1999-21.pdf.

Process Migration, Milogicic et al., Dec. 5, 1998, pp. 25-48. Accessed: http://www.hpl.hp.com/techreports/1999/HPL-1999-21.pdf.

Process Migration, Milogicic et al., Feb. 1999, pp. 1-1. Accessed: http://www.hpl.hp.com/techreports/1999/HPL-1999-21.pdf.

Tracking RDF Graph Provenance using RDF Molecules, Ding et al., pp. 1-2. Accessed on Aug. 17, 2010, 2010, http://aisl.umbc.edu/resources/219.pdf.

Boldyrev, S., et al., "A Mechanism for Managing and Distributing Information and Queries in a Smart Space Environment", Jul. 30, 2009, Special Issue of the 1st International Workshop on Managing Data with Mobile Devices (MDMD 2009), Ubiquitous Computing and Communication Journal, Chapter 2, pp. 1-10.

International Search Report for PCT Application No. PCT/FI2011/050689 dated Feb. 2, 2012, pp. 1-7.

Wrriten Opinion for PCT Application No. PCT/FI2011/050689 dated Feb. 2, 2012, pp. 1-7.

* cited by examiner

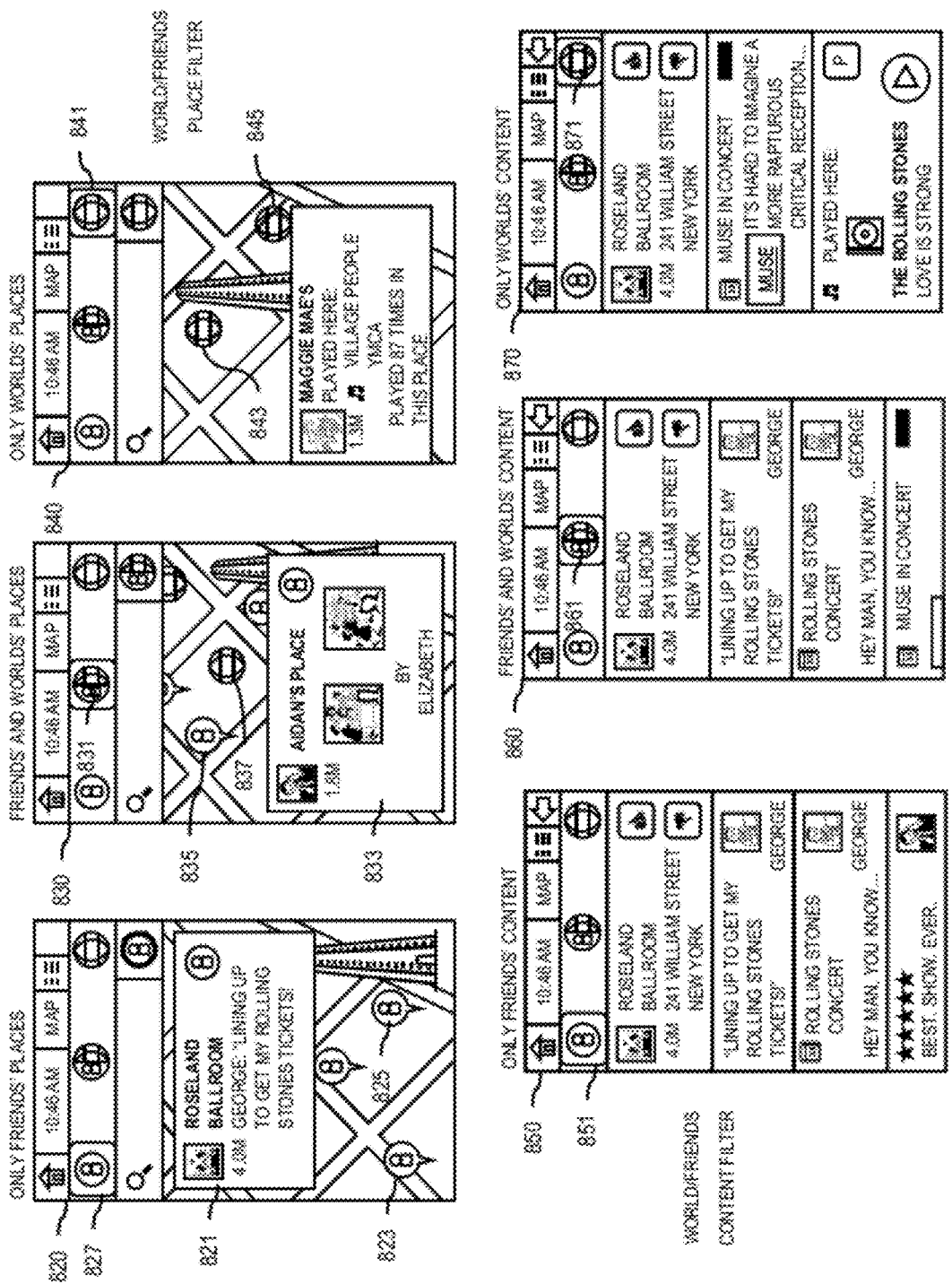

METHOD AND APPARATUS FOR DETERMINING SEARCH RESULTS BASED ON FILTERED INFORMATION

BACKGROUND

Wireless (e.g., cellular) service providers, for example, continue to develop more enhanced network services and applications. Consequently, manufacturers of mobile devices (e.g., cellular phones) are challenged to continually add greater functional capabilities in smaller form factors. Users additionally utilize these services and applications more and more to traverse content available over one or more networks (e.g., via the Internet). However, with the vast amount of content available over the Internet, users can be drowned in irrelevant or unwanted information. Search engines and other services (e.g., mapping services) provide searching based on criteria, however, it is technically challenging for these services to provide relevant information to users without the user specifying the criteria.

Some Example Embodiments

Therefore, there is a need for an approach for determine search results based on filtered content requests.

According to one embodiment, a method comprises detecting a content request from one or more programs. The method also comprises determining, at another program, to filter the content request, the one or more programs, or a combination thereof. The method further comprises determining one or more results of the content request based, at least in part, on the filtered content request, the filtered one or more programs, or a combination thereof.

According to another embodiment, an apparatus comprises at least one processor, and at least one memory including computer program code, the at least one memory and the computer program code configured to, with the at least one processor, cause, at least in part, the apparatus to detect a content request from one or more programs. The apparatus is also caused to determine, at another program, to filter the content request, the one or more programs, or a combination thereof. The apparatus is further caused to determine one or more results of the content request based, at least in part, on the filtered content request, the filtered one or more programs, or a combination thereof.

According to another embodiment, a computer-readable storage medium carries one or more sequences of one or more instructions which, when executed by one or more processors, cause, at least in part, an apparatus to detect a content request from one or more programs. The apparatus is also caused to determine, at another program, to filter the content request, the one or more programs, or a combination thereof. The apparatus is further caused to determine one or more results of the content request based, at least in part, on the filtered content request, the filtered one or more programs, or a combination thereof.

According to another embodiment, an apparatus comprises means for detecting a content request from one or more programs. The apparatus also comprises means for determining, at another program, to filter the content request, the one or more programs, or a combination thereof. The apparatus further comprises means for determining one or more results of the content request based, at least in part, on the filtered content request, the filtered one or more programs, or a combination thereof.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8B is a diagram of user interfaces utilized in the processes of FIGS. 8A and 5, according to one embodiment;

DESCRIPTION OF SOME EMBODIMENTS

Examples of a method, apparatus, and computer program for determining search results based on filtered information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to an aggregated information set from different sources. This multi-sourcing is very flexible since it accounts and relies on the observation that the same piece of information and/or related processes can come from different sources. For example, the same information and/or related processes (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Figure 1:
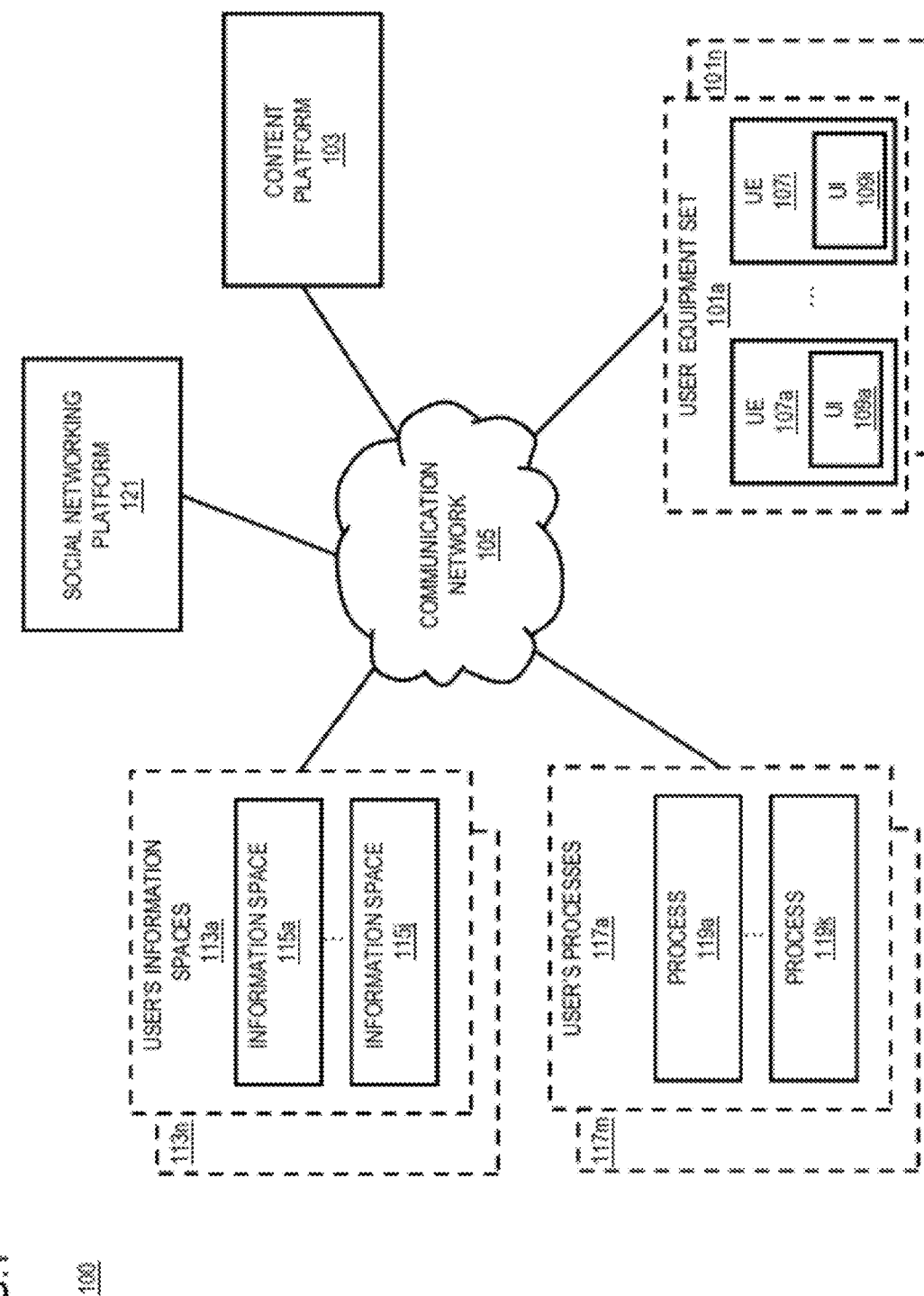
FIG. 1 is a diagram of a system capable of determining content results based on filtered information, according to one embodiment.

FIG. 1 is a diagram of a system capable of determining content results based on filtered information, according to one embodiment. With the continuing interest in users of devices to access content over one or more networks, content is aggregated at various locations (e.g., content websites such as mapping websites, navigation website, search engines, other web pages and sites, etc.). Users attempt to retrieve this content using one or more interfaces (e.g., web portals, application programming interfaces, etc.) from such locations. As such, the users can provide search criteria (e.g., a currently location of the user, a keyword, a location, etc.) to retrieve content from the locations. However, these contents are generally based on the input criteria and not customized to any particular user based on other criteria.

There has been development of distributed systems for managing information and related applications and/or processes. By way of example, such systems can be achieved through numerous, individual and personal information spaces in which persons, groups of persons, etc. can place, share, interact and manipulate webs of information and/or applications with their own locally agreed semantics without necessarily conforming to an unobtainable, global whole. These information spaces, often referred to as smart spaces, are extensions of the 'Giant Global Graph' in which one can apply semantics and reasoning at a local level. More specifically, information spaces are working spaces embedded within distributed infrastructures that can span multiple computers, information appliances, sensors, and the like. In some instances, computing processes (e.g., granular reflective processes) associated with the information spaces may also be distributed over the infrastructures. However, technical challenges arise in utilizing these distributed systems to provide customized results.

To address these problems, a system 100 of FIG. 1 introduces the capability to determine content results based on filtered information. Filtered information can include one or more content requests and/or programs. Determining these search results may be based upon an information space infrastructure. As such, the information space infrastructure may be utilized to detect a content request from one or more programs. In certain embodiments, a program (e.g., a computer program or software program) is a sequence of instructions written to perform one or more tasks for a computer or processor. Computers can execute the program instructions at one or more processors. Programs can include operating system instructions, application specific instructions, a combination thereof, etc. In one embodiment, operating system instructions are designed to operate computer hardware and can provide and/or maintain one or more applications. In another embodiment, application specific instructions are instructions that can be used to execute one or more applications. These applications can be used to facilitate a user to perform one or more specific tasks (e.g., a word processing application can facilitate access to one or more documents, a media application can facilitate creation and presentation of media content, etc.).

Another program can determine to filter the content request, one or more programs, or a combination thereof based on one or more criteria. The one or more criteria can be based on a relevancy of the potential results to the user. For example, it has been demonstrated that users value information and/or content when it is recommended by someone the users know. Thus, the system 100, utilizing information space technology, can detect whether any content has been produced by other people that the content requesting user knows or trusts and filter content requests and/or content results based on the people that the user knows.

As previously described, an information space comprises or consists of, for instance, several distributed devices that communicate information (e.g. RDF graphs) via a shared memory such as a Semantic Information Broker (SIB). In one embodiment, a device within an information space environment may store information locally in its own memory space or publish information to the semantic information broker. In the first case, the device is responsible for any process needed for combination or extraction of information, while in the second case the data manipulation processes can be conducted by the semantic information broker. By way of example, the information stored within an information space may be organized as lists or sets of information that can include many data elements (e.g., a contact list, inventory of goods, business directory, etc.).

The basic concept of information space technology includes providing access to distributed information for various devices within the scope of the information space. In certain embodiments, this access is provided in such a way that the distributed nature of the information is hidden from users. As a result, the information space appears to a user as if all the accessed information is stored on the same device. The information space also enables a user to have control over information distribution by transferring information between devices that the user has access to. For example, a user may want to transfer information among work devices, home devices, and portable devices. Technologies can enable a user of a mobile device to manipulate contexts such as data and information via the elements of one or more user interfaces of one or more user equipments.

In order to enable a user of an information space, who connects to the information space via one or more user devices, to distribute computations among one or more user devices or other devices with access to the information space, each computation is deconstructed to its basic or primitive processes or computation closures. As used herein, computation closures refer to relations and communications among various computations including passing arguments, sharing process results, flow of data and process results, etc. Once a computation is divided into its primitive computation closures, the processes within or represented by each closure may be executed in a distributed fashion and the processing results can be collected and aggregated into the result of the execution of the initial overall computation. In certain embodiments, the processes can be executing programs.

As shown in FIG. 1, the system 100 comprises one or more user equipment sets 101*a*-101*n* having connectivity to a content platform 103 via a communication network 105. The user equipment sets 101*a*-101*n* can comprise or consist of user equipments (UEs) 107*a*-107*i*. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107 can support any type of interface to the user (such as "wearable" circuitry, etc.).

In one embodiment, the UEs 107a-107i are respectively equipped with one or more user interfaces (UI) 109a-109i. Each UI 109a-109i may comprise or consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, information spaces, and other infrastructure. The process migration can be initiated for example by means of single-cast (e.g., to just another UE 107) or multicast (e.g., to multiple other UEs 107). Additionally, process migration may be triggered via gesture recognition, wherein the user preselects a particular set of UI elements and makes a gesture to simulate "pouring" the selected UE elements from one device to another. It is contemplated that any other gesture (e.g., a sliding gesture, movement towards another UE 107, spinning, rotating, etc.) may be used to indicate a request to migrate a process from one UE 107 to another UE 107, another component of the network 105, or the like.

As shown in FIG. 1, a user of UEs 107a-107i may own various pieces of information distributed over a set 113a of information spaces 115a-115j. The user can access the information via the set of equipment 101a consisting of UEs 107a-107i, wherein each UE 107a-107i is equipped with one or more UIs 109a-109i. Furthermore, each UE 107a-107i may have access to a set 117a of processes 119a-119k that can be used to manipulate the information stored in information spaces 115a-115j and produce results requested by the user of the UE 107.

In one embodiment, the content platform 103 includes information about binding between the elements of each UI 109a-109i, areas of rendered UIs 109a-109i, and actual information processing through processes 119a-119k. The binding information enables a user of a UEs 107a-107i to, for example, visually assign particular tasks to other UEs 107 owned by the same user. In one embodiment, binding between the elements or regions of UIs 109a-109i and the actual computations or functions performed by processes 119a-119k is done through computation closures defined and stored by the content platform 103. As used herein, computation closures identify relations and communications among various processes including passing arguments, sharing process results, flow of data and process results, etc. The computation closures (e.g., a granular reflective set of instructions, data, and/or related execution context or state) provide the capability of slicing of computations for processes 119a-119k for a user and transmitting the computation slices between UEs 107a-107i, content platform 103 and information spaces 115a-115j.

The content platform 103 may use seamless information processing techniques in order to enhance the computation closures. Seamless information management is the enabling technology for reflective process or context migration. In one embodiment, in addition to the migration of computations between devices, virtual execution environments such as M3® may be dynamically bound. The application of seamless information processing techniques may allow dynamically balanced load between concurrent execution environments taking into account the user's current context.

In one embodiment, the content platform 103 can detect the use of a program executing on a UE 107 of a UE set 101. The content platform 103 can additionally detect a request for content from the program. One or more processes of the program can be broken down into closures as described above and further detailed in FIGS. 6 and 7. Further, one or more content requests of the closure (e.g., a request for information about a certain location, a search engine request, etc.) can be broken down into closures. These closures can then be filtered according to criteria be utilized in determining corresponding results for the content.

The content platform 103 can determine context information about the UE 107 and/or a user of the UE 107 to utilize in the filtering process. Context information can include a location, a time, an activity (e.g., a calendar entry), a social graph associated with the user, combinations thereof, etc. In certain embodiments, a social graph is a data structure or a group of data structures (e.g., list, table, etc.) that stores connection and relationship information between users (e.g., connections via accounts of users or members of a social networking service). For example, groups (e.g., family, friends, colleagues, co-workers, acquaintances, etc.) may be depicted or described as associations within information stored about the user. Further, social graphs can be extracted from social networking services and/or generated by identifying and linking relationships based on contact information. As such, the social graph can be determined according to various resources such as a contact list and/or communication history associated with one or more of the UEs 107 of the UE set 101, collected from one or more social networking platforms 121, or the like. Further, the social graph can be tiered hierarchically and have levels of importance associated with one or more users in the social graph. For example, a person in recent communication or on a favorites list may be associated with a first level, direct contacts of the user may be associated with a second level, secondary contacts (e.g., friends of friends) can be separated based on additional levels, etc. If a person is not associated with the social graph, the person can be associated with another category e.g., a rest of the world category.

Further, relevancy information can be determined that is associated with the context information. The relevancy information can be associated with people according to the social graph (e.g., based on a level closeness of the people), a pertinence of a person in the social graph corresponding to a potential result (e.g., whether a friend is a food critic or has critiqued multiple food places would be pertinent to food establishments but not necessarily opera), ratings, distance from a particular location (e.g., a location of the user), time accessibility (e.g., if an establishment is not open during a particular set time frame, it may not be relevant as a result because the user cannot utilize the establishment), recentness of update of content, combinations thereof, etc. The content platform 103 and/or user preferences can set one or more points for one or more types of information. The relevancy information can be generated as a total score for each potential result based on the relevancy criteria. As such, relevancy information and/or context information may be utilized in filtering information utilized to retrieve search results as well as to filter content request results. Relevant information and/or information from a person that is associated with the user can be more useful to the user because there is a built in relationship/trust.

By way of example, the UEs 107 of sets 101a-101n, the content platform 103, and the information space sets 113a-113n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
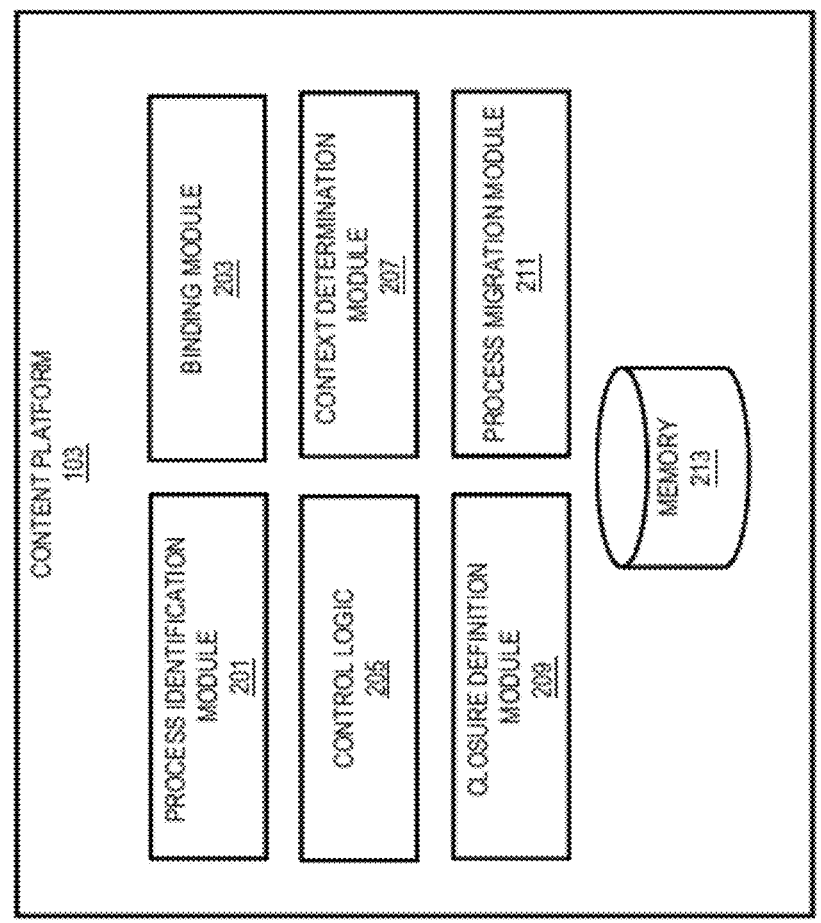
FIG. 2 is a diagram of the components of a content platform, according to one embodiment.

FIG. 2 is a diagram of the components of a content platform, according to one embodiment. By way of example, the content platform 103 includes one or more components for filtering information to generate results for content requests. It is contemplated that the functions of these components may be combined in one or more components or performed by other components of equivalent functionality. In this embodiment, the content platform includes a process identification module 201, a binding module 203, control logic 205, a context determination module 207, a closure definition module 209, a process migration module 211, and a memory 213.

The content platform 103 receives a content request associated with a user of a first UE 107a via, for example, a touch enabled input, a keypad, etc. The process identification module 201 analyses the received input and determines the processes that are bound to one or more UI elements identified the content request. The content platform 103 may include a predefined library of binding relations between various UI elements with lists of processes (for example, a search criteria entry UI element can be associated with a search engine process, a location entry UI element can be associated with a mapping process, etc.). The binding library may be assembled by software developers throughout the development phase for each UE type using the binding module 203 and stored in the memory 215. Once the processes bound to the selected UI components are identified, the context determination module 207 determines a context including a user context (e.g., the state of the first UE 107a and UI 109a), an execution context (e.g., the memory states, processors states, and related information of device when executing a particular application or service) or a combination thereof for the identified processes. The determined context can be used during the reconstruction process at a second UE 107b, the first UE 107a, or a combination thereof.

In one embodiment, the closure definition module 209, determines computation closures (e.g., a granular reflective set of instructions, data, and/or related execution context or state) for processes related to the selected UI elements and stores the closures in the memory 213. The stored closures may be used for slicing computations into smaller independent processes to be executed by various available UEs 107a-107i, using the data that may be stored on the distributed information spaces 115a-115j.

In another embodiment, the control logic 205 utilizes the identified processes, determined context, and defined closures to produce one or more serialized granular computation elements.

In one embodiment, the context serialization may be generated and stored using RDF format. As previously mentioned, RDF is a family of World Wide Web Consortium specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

It is noted that the UI element or UI regions utilized by the user can be granularly fractioned. The granularity may be achieved by the basic format of operation (e.g. RDF) within the specific computing environment. Furthermore, the reflectivity of processes (i.e., the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces.

In one embodiment, the process migration module 211 identifies the targeted virtual run-time environment (e.g., the processing agents) where the processes can be migrated to. Prior to migration of the processes, the process migration module 211 ensures that the targeted environment has proper access to the information required by the processes. The process migration module 211 may query the agents within the targeted environment about their access capabilities (e.g., access rights, permissions, connectivity, etc.).

By way of example, access capabilities may also specify what specific information, context, computing closures, processes, etc. are accessible by the targeted environment. The process migration module 211 may then determine whether the information accessible by an agent of the target environment is consistent (e.g., compatible formats, correct versions, compatible runtime environments, etc.) with the information required by the processes and also whether the resource load in the target environment allows the agents in the environment to accept execution of migrated processes. If the consistency condition is met and the target environment has sufficient available resources, the process migration module 211 transfers the processes to the target environment. Otherwise, a warning may be issued to the user of the first UE 107a stating that the selected second UE 107b is unable to perform the requested tasks or processes. The transmission of processes may be a direct transmission or an indirect transmission via an information space 115a-115j, a third device, a cloud-computing component, a network infrastructure element, or a combination thereof.

Following the migration of processes to the target environment on the second UE 107b, the second UE 107b reconstructs the migrated processes by simulating the context as stored in the memory 213. By way of example, this simulation may include emulating any necessary runtime environments for executing the transferred processes. In addition or alternatively, the reconstruction of the user context, execution context or the combination thereof may be performed by a third device. In this manner, one or more devices (e.g., the second UE 107b and the third UE 107c) can reconstruct all or a portion of the processes of the first UE 107a for execution individually or cooperatively in parallel.

It is noted that all the information that is exchanged among the components of the content platform 103, which may be a part of an information management infrastructure, including the granularity, the reflectivity, the context, the targeted environment, the information accessible by agents, etc., may be encoded (e.g., serialized) and stored in RDF format so that the pieces of information are compatible and, therefore, combining and extracting of information can be performed with less complexity.

In one embodiment, a physical structure (e.g., a server) of the content platform 103 receives the content request. The control logic 205 and the context determination module 207 can be utilized to filter processes and/or content requests to generate filtered results. The filtering can be implemented via one or more relevancy parameters and/or context information (e.g., social graphs) that may be stored in the memory 213, received from another location, determined according to information, or a combination thereof. Then, the filtered results can be presented to one or more users of the user equipment set 101. Example results are further detailed in FIGS. 3 and 4.

Figure 3:
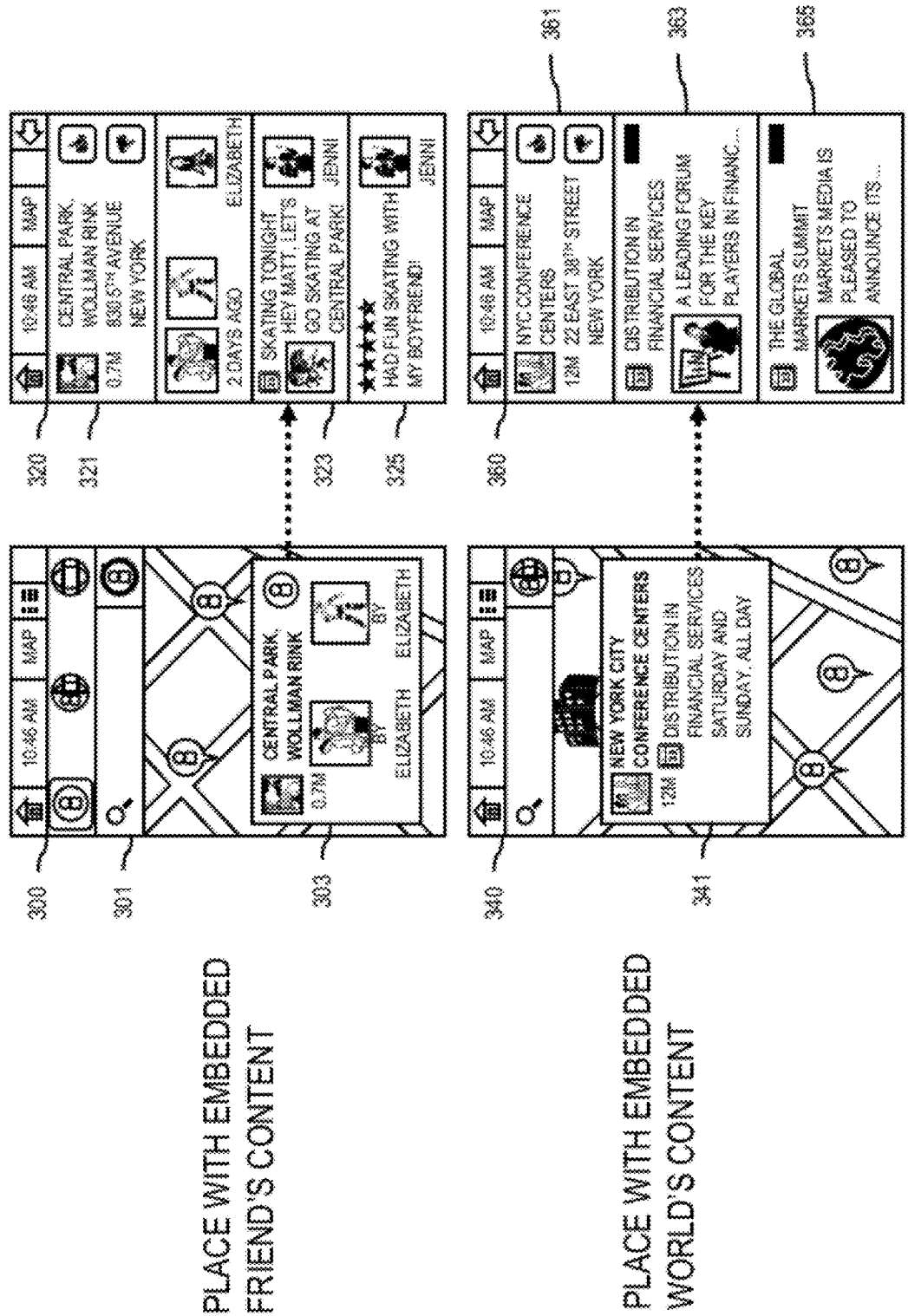
FIGS. 3 and 4 are diagrams of user interfaces generated based on filtered content requests or programs, according to various embodiments.
Figure 4:
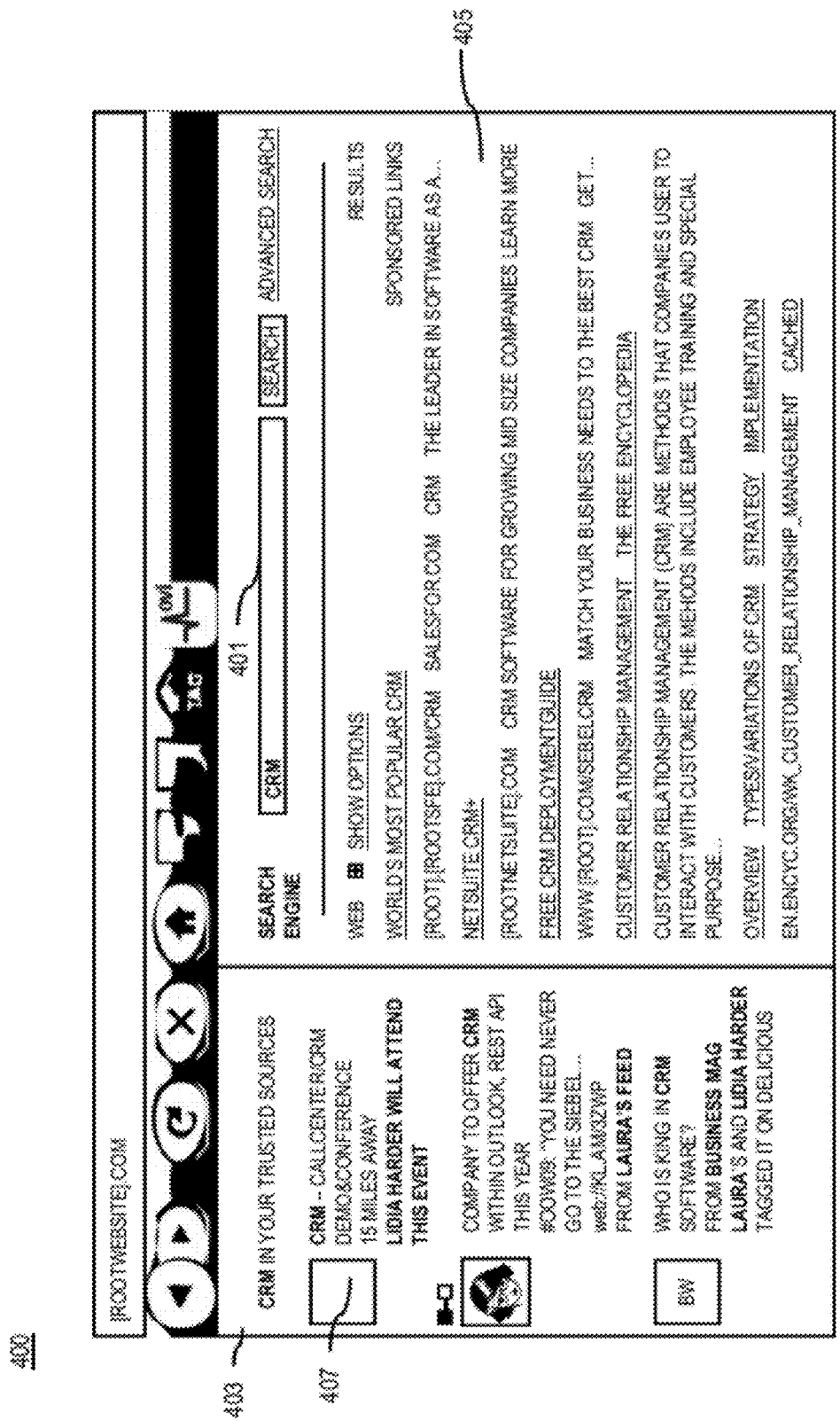

FIGS. 3 and 4 are diagrams of user interfaces generated based on filtered content requests or programs, according to various embodiments. FIG. 3 is associated with user interfaces 300, 320, 340, 360 utilized in one or more searches for content. The user can enter search criteria at the first user interface 300. The search criteria may be based on the user's location (e.g., specifying "find things near me"), on another location (e.g., find things near another UE 107 in my information space 115, find skating rinks near a particular location, etc.). In certain scenarios, criteria can be specified by the user, a default option, selected by another UE 107 in an information space 115, etc.

An application is associated with user interface elements displayed on the user interface 300. These user interface elements can include a search input user interface element 301, filtered search result 303, etc. In this scenario, a filtered search result 303 is highlighted as compared to other results. One or more criteria as described above can be utilized in the filtering. As such, it can be determined that information associated with Elizabeth should be presented. This can be determined based on a social graph and/or other contextual information. For example, Elizabeth may have commented on a skating rink in central park recently and is a direct contact of the user. In certain scenarios, the Wollman Rink may be determined to be presented instead of one or more other skating rinks associated with the search because of Elizabeth's comments.

Further, more detailed information can be presented on user interface 320 if the Wollman Rink UI element is selected (e.g., via a touch enabled input, a keypad input, etc.). As such, more detailed information about the skating rink is presented on a UI element 321. Elizabeth's comments can be sorted to the front based on one or more criteria (e.g., relevancy criteria). Further, UI elements 323, 325 associated with other users (e.g., Jenni) can be presented. In certain scenarios, some information associated with Jenni (e.g., a calendar UI element 323) can be presented ahead of a past comment rating UI element 325.

User interface 340 shows another search with personalized world content. In this scenario, it was determined that no persons associated with a social graph of the user have commented on associated content. A determination of whether a person is associated with a social graph can be based on one or more comparisons or matching of information. For example, pictures associated with the person in a social graph can be matched to pictures associated with the content (e.g., a picture of the person's face). Additionally or alternatively, the matching information may be associated with a username, an e-mail address, another identifier, a name, a location, an address, one or more tags, etc. Further, when the content is generated, the content can be associated with the persons, which can add metadata to base content filtering upon. Content associated with the rest of the world can be filtered and/or sorted based on relevancy criteria. For example, the New York City Conference Centers UI element 341 can be sorted result content based on the previously discussed relevancy scoring procedures. When selected, additional content results 361, 363, 365 can be presented. Further, these content results 361, 363, 365 can be sorted according to the relevancy criteria mentioned above.

FIG. 4 shows a user interface 400 for searching based on one or more keywords generated based, at least in part, on filtered content requests or programs. These filtered requests may be associated with a search engine. The search engine can include a keyword entry UI element 401. The left hand panel 403 can be utilized to filter results based on context information. In this example, the user can search for the term CRM. The term CRM provides as a result the information (e.g., one or more search results) associated with the term CRM available on the search engine at a right hand frame 405. One or more additional search information can be navigated to (e.g., by scrolling or utilizing another page). The left hand panel 403 is utilized to provide additional results that may be more relevant to the user (e.g., based on relevancy information such as trust in the information). In this scenario, the search results provide, on a UI element 407 that a connection (e.g., a friend, a friend of a friend, etc.) of the user, Linda Hardner, is attending a particular event. When selected, this UI element 407 can lead to another web page. Further, another connection, Laura may post content that is retrieved in the search. This may occur via a blog, a text upload, etc. Moreover, in certain scenarios, bookmarks to links by one or more connections (e.g., Laura and/or Linda) can be searched and utilized in determining content results. These bookmarks may be associated with one or more social networking platforms 121.

Figure 5:
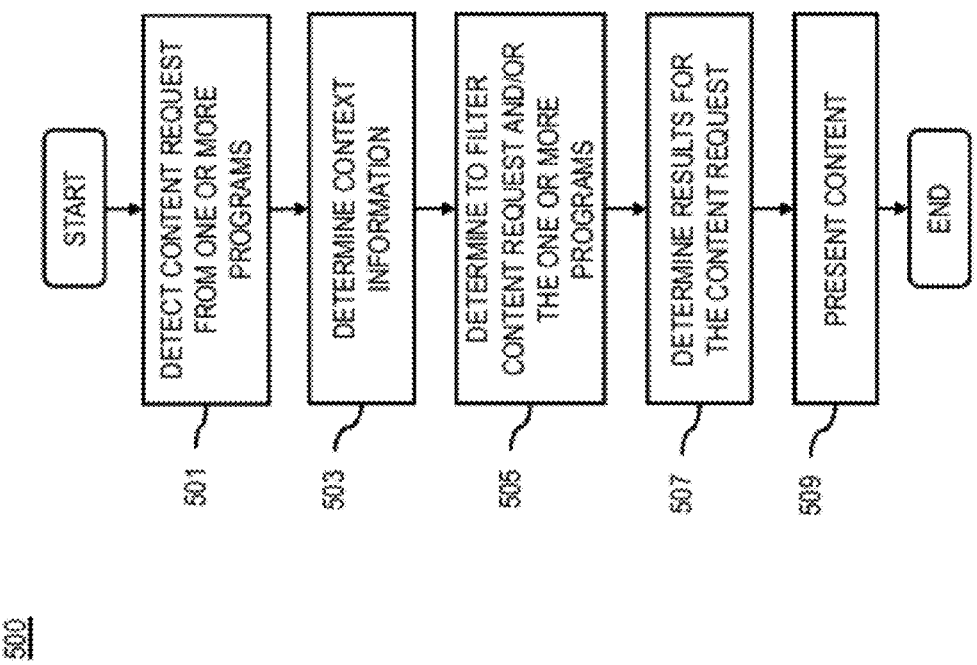
FIG. 5 is a flowchart of a process for determining search results based on filtered information, according to one embodiment.
Figure 10:
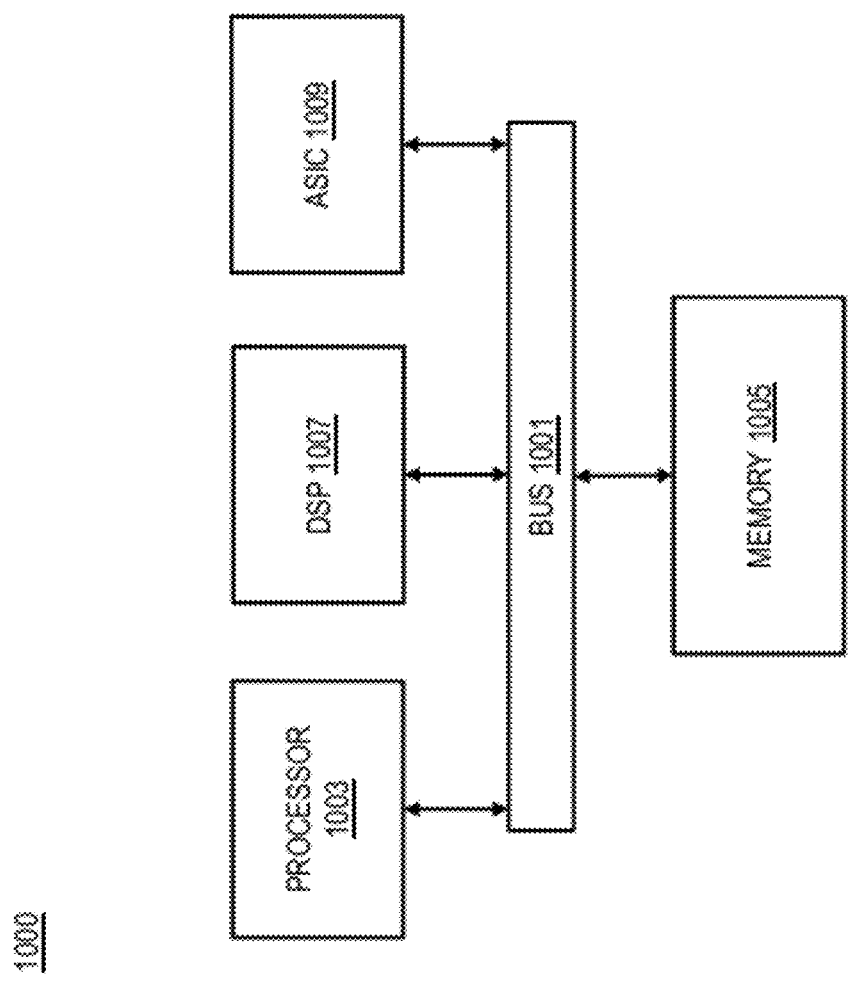
FIG. 10 is a diagram of a chip set that can be used to implement an embodiment of the invention.

FIG. 5 is a flowchart of a process for determining search results based on filtered information, according to one embodiment. In one embodiment, the control logic 205 performs the process 500 and is implemented in, for instance, a chip set including a processor and a memory as shown in FIG. 10. Further, one or more other components of the content platform 103 or information space set 113 can be utilized to perform the process 500. Thus, one or more components of the content platform 103 and/or other components of the information space set 113 can be utilized as means for performing the process 500 as well as other processes.

At step 501, the control logic 205 detects a content request from one or more programs. The content request may be associated with a UE 107 and/or user of a user information space set 113. Further, the content request may be, for example, a search for content, a request for information associated with a particular location, a request for a particular type of information associated with a location, a request to retrieve content, combinations thereof, etc. One or more criteria may be associated with the content request by default or using preferences. For example, a user may enter that the user would like certain types of content information during certain periods of time. As noted above, a program can be at an application level, at a system level (e.g., operating system component), or a combination thereof.

Context information associated with associated with the UE 107, the user, or a combination thereof is determined (step 503). The context information may include a social graph (e.g., a hierarchical social graph) as detailed above. Further, the context information can include a location, a time, an activity, combinations thereof, etc. The context information may be utilized to determine relevancy information. The context information and/or relevancy information, as noted above, is utilized in filtering the content request and/or one o more of the programs.

At step 505, the control logic 205 determines, at another program (e.g., a program different from the one or more programs associated with the content request), to filter the content request, the one or more programs, or a combination thereof. The filtering can be done based on one or more criteria. The criteria can include one or more rules to determine to filter out the content request and/or programs. For example, the criteria can be based on a social graph. Thus, if the content request does not query a database that includes information associated with the social graph, the content request can be filtered.

The control logic 205 determines one or more results of the content request based, at least in part, on the filtered content request, the filtered one or more programs, or a combination thereof (step 507). The results can be determined by completing the filtered content request and/or executing the filtered programs. In one embodiment, if the content request is filtered, no results are generated. In certain embodiments, the content request, the one or more programs, the one or more results, or a combination thereof are represented as one or more computation closures, one or more information closures, or a combination thereof. These closures can be filtered as further detailed in FIG. 7. The results can be generated by completing the content request. Further, the content results can be filtered according to one or more criteria. In this scenario, metadata associated with the content can be utilized in comparisons to the criteria. As such, content that does not match the criteria can be filtered while content results that do match the criteria can remain.

These content results can then be presented (step 509). Further, one or more unfiltered results can be determined. These results can be associated with content that does not meet the criteria. The control logic 205 determines to present the one or more results, the one or more unfiltered results or a combination thereof as shown, for example, in FIG. 4 and FIG. 8B. As shown in FIGS. 4 and 8B, the presentation distinguishes the one or more results from the one or more unfiltered results.

Figure 6:
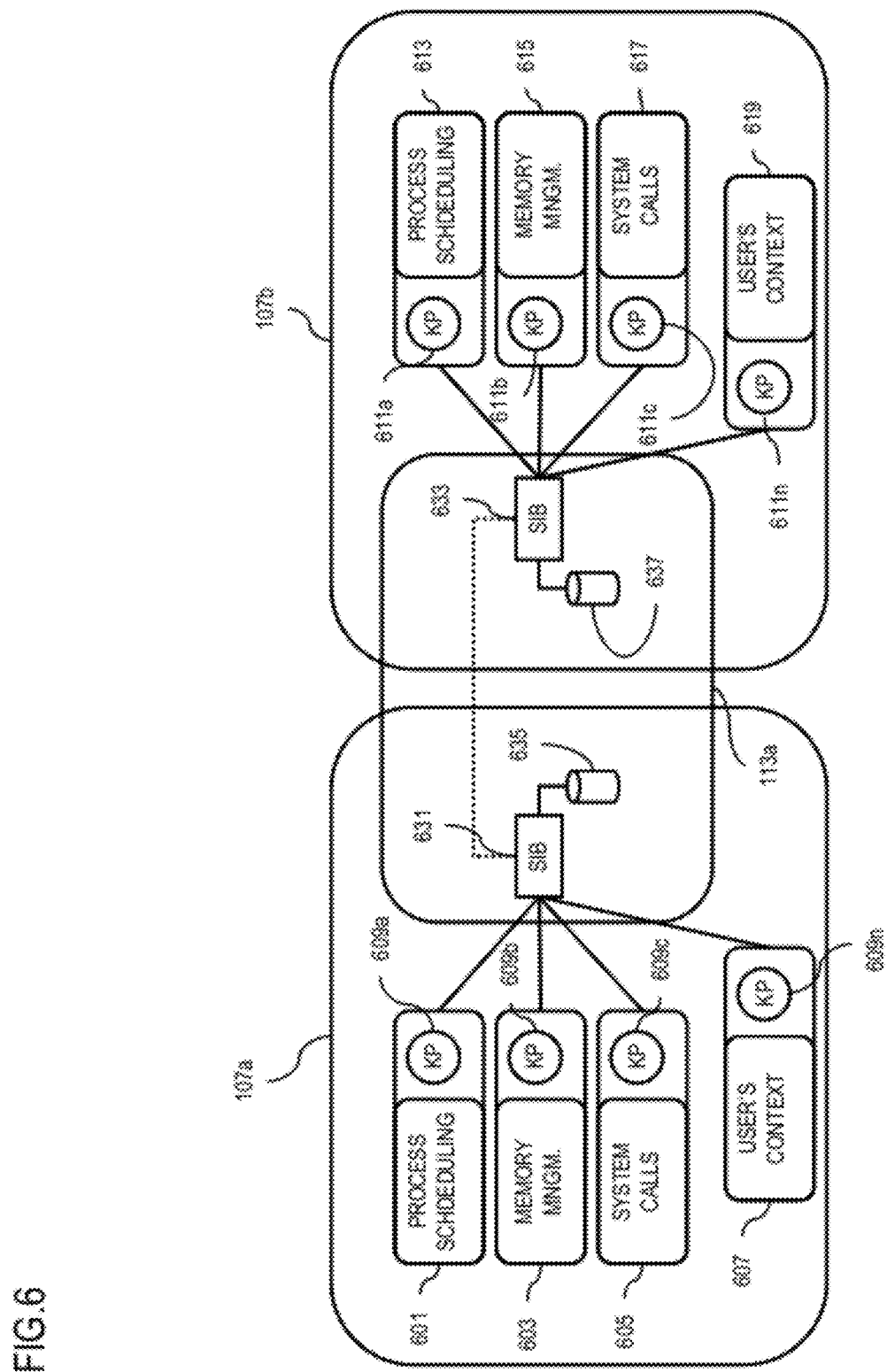
FIG. 6 is a diagram of sharing computation closures, according to one embodiment.

FIG. 6 is a diagram of sharing computation closures, according to one embodiment. The user may own an information space set 113a which is distributed between devices 107a-107i and other remote devices having connectivity to via communication network 105. The information space set 113a includes Semantic Information Brokers (SIB) 631 in UE 107a, the SIB 633 in UE 107b. Additionally, each information space in set 113a has knowledge processors (KPs) 609a-609n in UE 107a and 611a-611n in UE 107b. Furthermore, the information space may utilize storage components 635 and 637 of the devices involved in the information space. The SIBs of information space set 113a may communicate with each other (shown with dotted lines).

Typically, during an information processing lifecycle, one or more execution contexts that may be represented in RDF form based on sub-graphs are stored by a SIB 631 of an information space set 113a. The user context and execution context may result from execution of a program code of an application by a knowledge processor KP 609a-609n and stored in memory 635 of UE 107a which is utilized by SIB 631. If a KP 609a-609n of UE 107a detects that the UE 107b is attempting to communicate with UE 107a over a communications medium, UE 107a can share the user and execution contexts over a communications connection in the communications medium with UE 107b for continued or enhanced execution of an application by a KP 611a-611n in UE 107b. Following the completion of the process on UE 107b, the UE 107a may receive an alert from the SIB 631 indicating closing of the communication connection with (for example stationary wireless) UE 107b. In this case, UE 107a may receive updated user and execution contexts from the UE 107b over the communications connection so that the UE 107a can continue the execution of the application on a KP 609a-609n.

In one embodiment, the information and execution contexts to be shared between UE 107a and UE 107b may be associated with sharing a network connection among the UEs provided by the content platform 103. It is noted that a communications medium can be physical or logical/virtual, but in this embodiment all managed by the content platform 103. The sharing of the user and execution contexts and reflective process execution of the applications associated with connection sharing on KP 611a-611n of UE 107b is managed by the content platform 103. The content platform 103 shares and provides reasoning about user and execution contexts between UE 107a and UE 107b with SIBs 631 and 633. For example, UE 107a may be a mobile wireless with a network radio and UE 107b may be a mobile device with a local radio.

The content platform 103 enables aggregation of user and execution context information and scheduling of the run-time environment. This enables changes to be made to one or more user contexts 607 and 619 and execution contexts (not shown). Changes to user and execution contexts may include starting, executing, scheduling, and dispersing, and aggregating of information related to connection sharing within the environment of the information space set 113a processes or tasks wrapped through KPs 609a-609n and 611a-611n or other KPs functionalities such as process scheduling 601 and 613, memory management 603 and 615, system calls 605 and 617, etc.

KPs 609a-609n and 611a-611n and their corresponding information in the form of RDF sub-graph dispersion and aggregation may be performed by selective recycling apparatus of the information space set 113a and/or the distribution. Selective recycling may be driven by a recovery-conscious scheduler that may be part of the information space environment scheduler and supported by information provided by the computing environment processes/tasks scheduler 601 and 613. The user contexts 607 and 619 and the execution contexts (not shown) related to connection sharing may be dynamically assigned and triggered by the content platform 103 and allocated according to a particular or operating system task management. It is noted that the terms KP and relevant information within SIB, represented as RDF sub-graph sets are abstract enough to be presented through other procedural aspects of the computing environment (e.g. a higher abstraction level).

In one embodiment, following the receipt of one or more user contexts 607 and 619 and additional execution contexts by UE 107b from UE 107a, and other relevant information over a communications medium, the UE 107b executes or shares the reflective state of the application by a KP 611a-611n. Upon completion of the process, the UE 107b may determine the information shared with SIB 633 through corresponding KP 611a-611n. This determination may result in closing a secure communication link with UE 107a. Prior to closing the communication connection, the UE 107b may share one or more user and execution contexts with UE 107a over the communications medium for continued execution of the application by KP 609a-609n in UE 107a. The sharing of the user and execution contexts and execution of the application on UE 107a is managed by the content platform 103. Such virtual run-time environment enables shared user and execution context sessions between UE 107a and UE 107b.

In another embodiment, prior to closing of the communication connection, the UE 107b may share an initial portion of the updated user and execution context with UE 107a over a initial communication connection and share the remaining portion of the updated user and execution contexts with UE 107a over the last communication connection for continued execution of the application on UE 107a. The adaptive computing platform described enables granular information processing context migration capability for a computing device to enhance the processing power of the devices within the information space environment.

Figure 7:
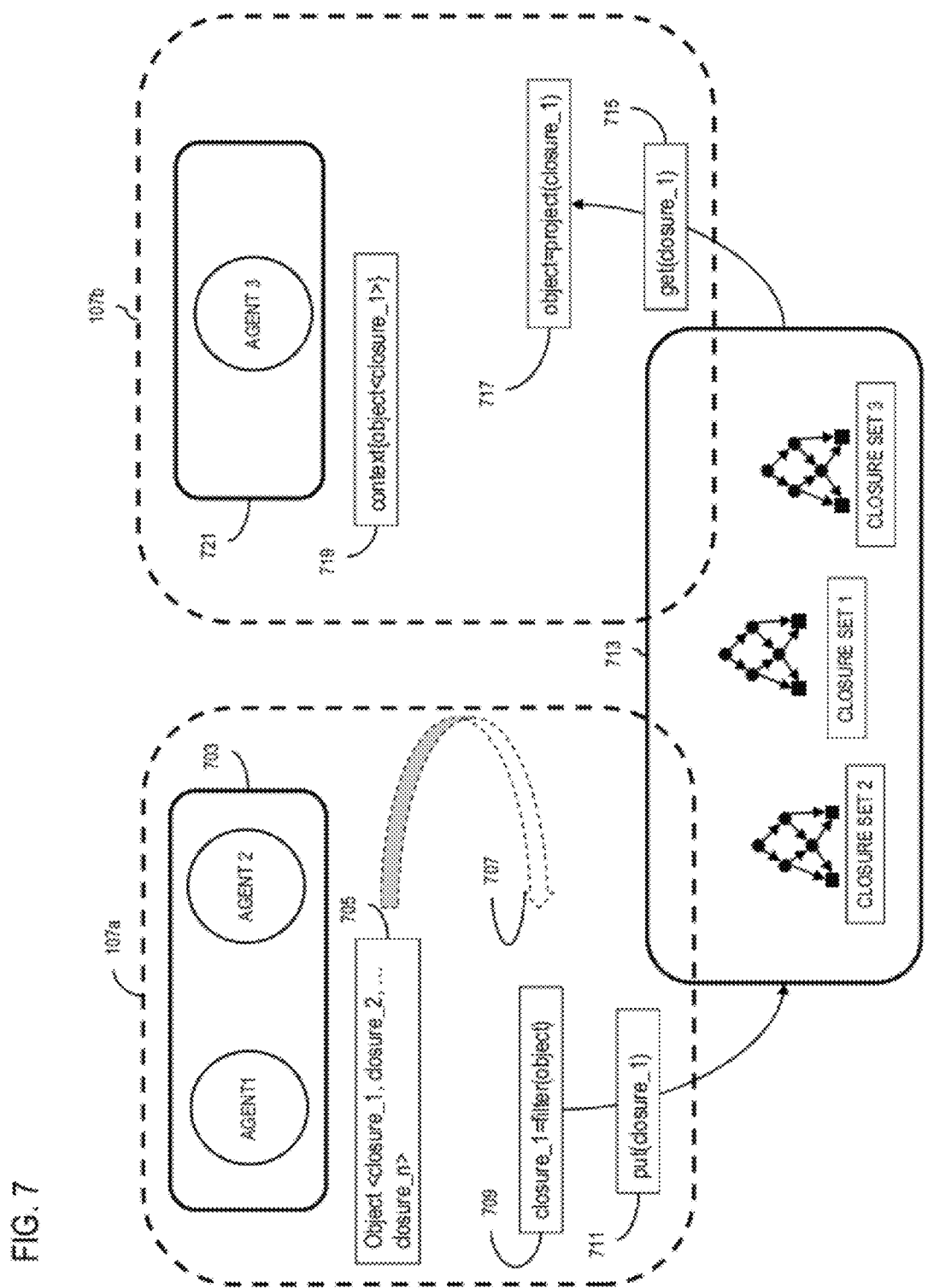
FIG. 7 is a diagram of process migration from a device to another device, according to one embodiment.

FIG. 7 is a diagram of process migration from a device to another device, according to one embodiment. In one embodiment, the UE 107a may include a user context 703 for every user of UE 107a. In one embodiment, the user context 703 may include computation closures to enable UE 107a to be activated and function as a connection point to the network for other UEs in its vicinity. Agent1 and agent2 may be processors that calculate and handle computation closures within the user context 703. The number of agents may be different in different devices based on their design, functionality, processing power, etc.

In one embodiment, the UEs 107a and 107b may be mobile devices belonging to friends who are members of one or more social networks, in which they have indicated each other as friends. In some other embodiments, one of the 107a or 107b may be a back-end device providing services to the users and the other device may be a UE which is signed up for the services provided by the back-end device. It is assumed in this example that user context 703 provides UE 107a with computation closures associated with the content requested by UE 107b. Therefore user context 603 and corresponding computation closures are migrated or otherwise provided to UE 107b based on a request for content initiated by UE 107b to the communication network 105. The migration process may be initiated by the content platform 103 upon receiving the request from UE 107b. The content platform 103 activates Agent1 and Agent2, which initiate migration of the computation closure 705 to the information space set 113a.

Block 705 represents an Object as a set of computation closures (e.g., closure_1, closure_2, . . . , and closure_n), where each closure is a component of a larger process, for example, related to a service provided to the user by the user equipment 107a such as a shared radio connectivity. Each closure can be a standalone process that can be executed independently from the other closures.

In the example of FIG. 7, the filtering process 709 extracts closure_1 from the closure set Object via filtering the set (shown in block 709). The extracted closure_1 is added to a computation closure store 713 using the exemplary Put command 711 by the control logic 205. In this example, assuming that the extracted computation closure, closure_1 is supposed to be executed on the user equipment 107b, the user equipment 107*b* extracts the computation closure closure_1 from the computation closure store 713 using the Get command 715.

In one embodiment, the decision of the equipment on which a computation closure is executed, may be automatically assigned. The extracted closure_1 is projected into a closure with the user device context (process states) and the object 717 is produced on UE 107*b*. The block 719 represents the reconstruction of the closure into the initial context. The aggregated context may then be executed in the runtime environment 721 of UE 107*b* by Agent3, allowing UE 107*b* to function as the activated UE within the connectivity group when its turn comes.

In another embodiment, the information related to activation process, which is transferred from UE 107*a* to UE 107*b* via computation closure store 713, is converted into computation closures in RDF format by the information space management system (not shown), if they are not already in RDF format. The migration processor Agent3 of UE 107*b*, which may be part of a larger process 721, and may be written in languages different from processors Agent1 and Agent2 in UE 107*a* (e.g. Python® or JavaScript®), enable the migration of the process into the UE 107*b*.

Upon receiving the process migration information at the UE 107*b*, activation of the Agent3 may trigger resumption of the execution of migrated computation closures within context 719 which enable UE 107*b* to be activated. In one embodiment, the one or more closures of the Object 705 can include one or more content requests, programs, results, or combinations thereof.

Figure 8A:
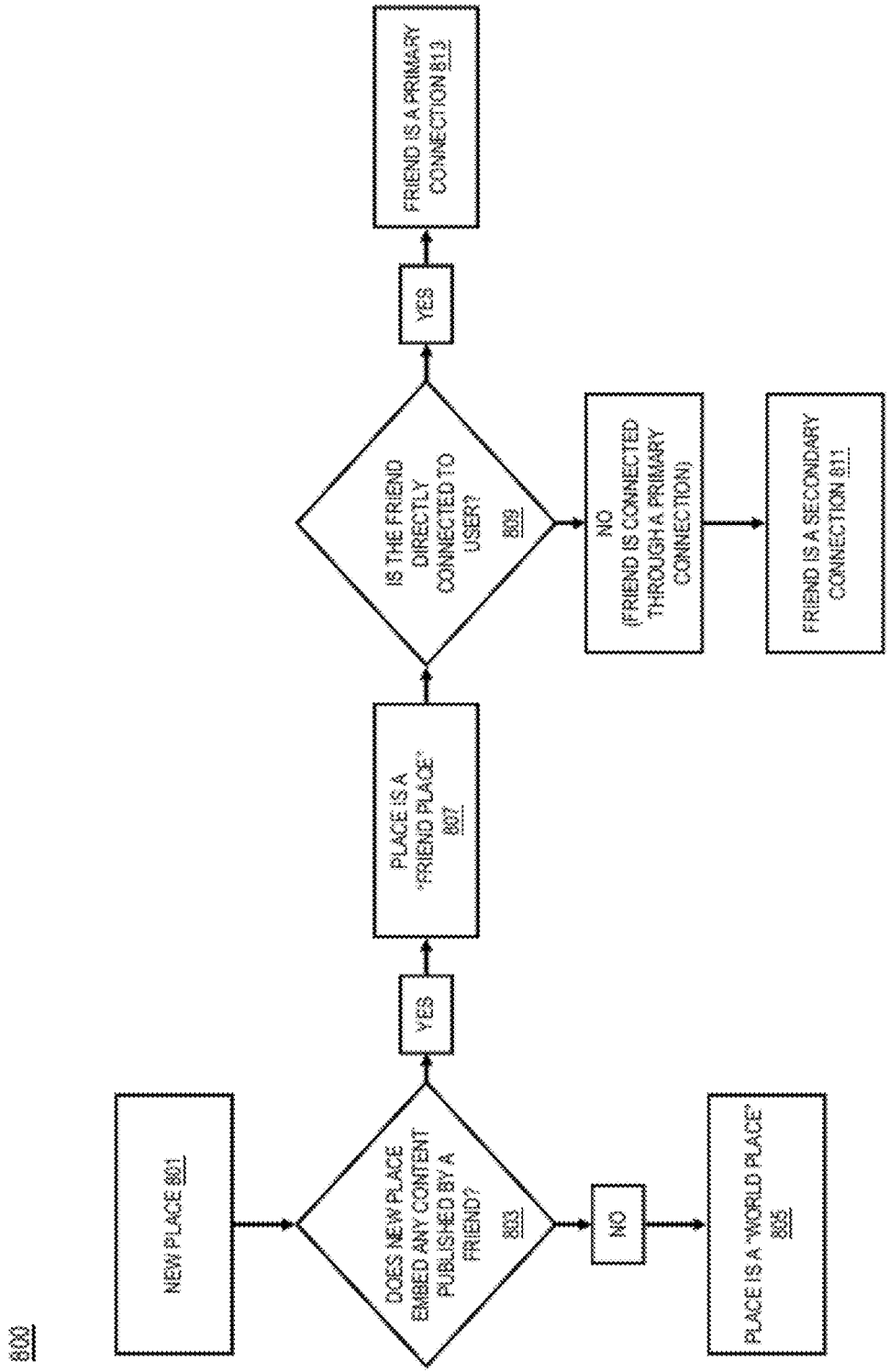
FIG. 8A is a process for filtering content according to a relationship of the user of a device and the content, according to one embodiment.

FIG. 8A is a process for filtering content according to a relationship of the user of a device and the content, according to one embodiment. In one embodiment, the control logic 205 performs the process 800 and is implemented in, for instance, a chip set including a processor and a memory as shown in FIG. 10. Further, one or more other components of the content platform 103 or information space set 113 can be utilized to perform the process 800. In this embodiment, content requested can be associated with a map application. The map application can determine content results (e.g., one or more places) to the content request and then filter the content results according to the process 800.

At step 801, a new place is determined to be a potential content request result. The new place is then determined to be categorized by the control logic 205. The control logic 205 can determine whether the new place includes any embedded content published by a member of the user's social graph (e.g., a friend) (step 803). If the place does not include any content associated with a member of the user's social graph, the place is designated in a first category (e.g., a "world place" category) (step 805).

Otherwise, if the place is associated with content associated with a member of the user's social graph, the place can be designated into another category (e.g., a "friend place" category) (step 807). This category can be further defined. For example, the control logic 205 can determine if the member of the social graph is directly connected to the user (step 809). If the member is not directly connected (e.g., a friend of a friend), the member is a secondary connection and the place can be designated as a secondary connection place (step 811). Further, if the member is directly connected, the member can be designated a primary connection and the place can be designated a primary connection place (step 813).

These categorical determinations can be utilized to then filter the place for presentation. FIG. 8B is a diagram of user interfaces utilized in the processes of FIGS. 8A and 5, according to one embodiment. User interface 820 shows a map application presenting one or more places 821, 823, 825 according to a filter showing only places that are associated with members of the user's social graph. A filter option 827 can be utilized to set this view.

User interface 830 shows the map application presenting places associated with a filter option 831 to show both friend places 833, 835 and world places 837. Further, if the user chooses, the user may select a filter option 841 for only world places 843, 845 on user interface 840.

Further, content on user interfaces 850, 860, 870 can be filtered based on criteria associated with the categories. For example a filter selection 851, 861, 851 can be respectively utilized to select content associated with friends, friends and the rest of the world, or only the world. As such, user interface 850 shows content associated with friends, user interface 860 shows content associated with friends or other world content, and user interface 870 presents content associated with the world and not friends of the user.

Moreover, in certain embodiments, the user interfaces can be presented in a three dimensional display. As such, the content may pop out or be shown with additional depth via the display. Further, the places can be determined using one or more augmented reality, mixed reality, positioning systems (e.g., global positioning system (GPS), assisted GPS, cell of origin, etc.), etc. These systems may additionally be invoked utilizing information spaces.

The processes described herein for determining content results based on filtered information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
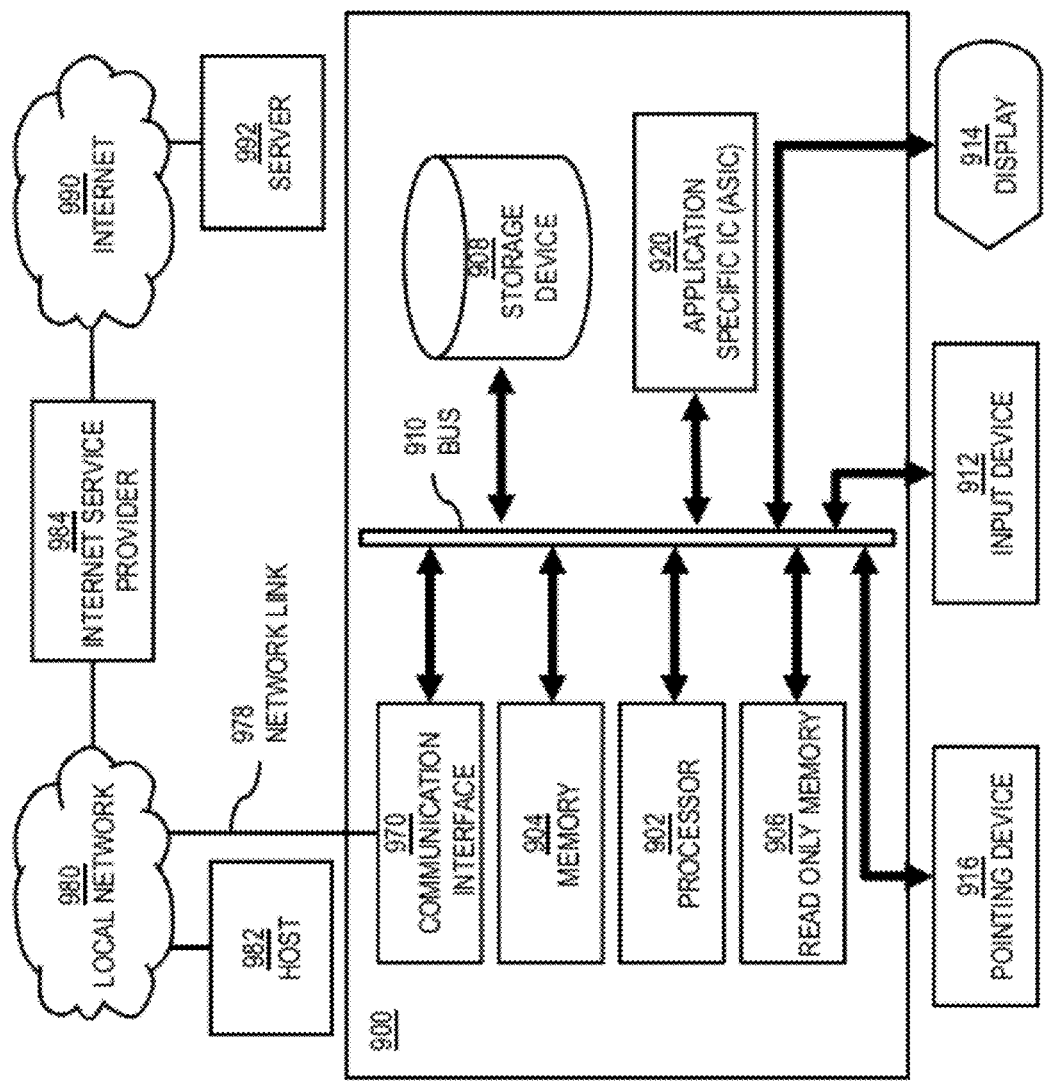
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine content results based on filtered information as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining content results based on filtered information.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determine content results based on filtered information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for determining content results based on filtered information. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining content results based on filtered information, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for the UE 107.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine content results based on filtered information as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining content results based on filtered information.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading.

The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine content results based on filtered information. The memory 1005 also stores the data associated with or generated by the execution of the inventive steps.

Figure 11:
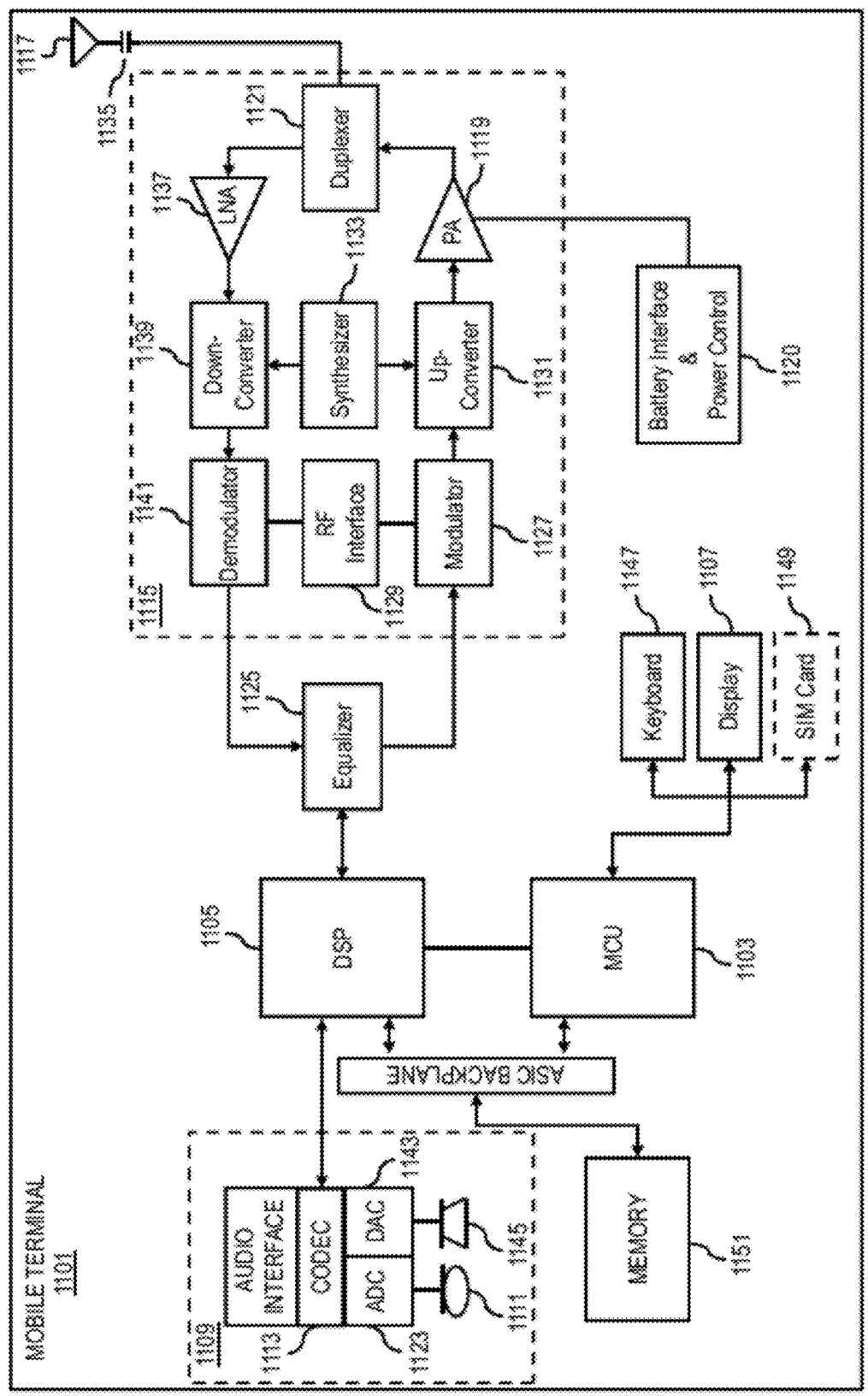
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of determining content results based on filtered information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining content results based on filtered information. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine content results based on filtered information. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  detecting a content request associated with a user from one or more programs;
  determining one or more processes associated with one or more user interface elements of the one or more programs;
  determining, at another program, to filter the content request;
  determining context information associated with one or more of the user and a device of the user;
  wherein the context information includes data that relates to a location, a time, an activity, and a social graph associated with the user that identifies levels of importance of people to the user;
  filtering results of the content request based on the context information;
  wherein filtering the results comprises (i) determining each of a plurality of types of relevancy information associated with a result including: level of importance of a person providing the result to the user in the social graph, a background pertinence of the person providing the result in the social graph corresponding to a potential result, ratings of a result point of interest, distance of the result point of interest to a location of the user, time accessibility of the result point of interest, and recentness of update of content associated with the result point of interest, (ii) setting one or more points for each of the plurality of types of relevancy information, and (iii) generating a total point score for the relevancy information associated with said each result based on the set one or more points; and
  causing a presentation of the results of the content request within the one or more user interface elements based on the filtered results.

2. A method of claim 1, further comprising:
  determining the social graph from one or more social networks, one or more contact lists, a communication history, context information, or a combination thereof.

3. A method of claim 1, wherein the one or more programs, the another program, or a combination thereof operate at a system level.

4. A method of claim 1, further comprising:
  determining one or more unfiltered results; and
  causing a presentation of the one or more results and the one or more unfiltered results within the one or more user interface elements,
  wherein the presentation distinguishes the one or more results from the one or more unfiltered results.

5. A method of claim 1, wherein the content request, the one or more programs, the one or more results, or a combination thereof are represented as one or more computation closures, one or more information closures, or a combination thereof.

6. An apparatus comprising:
  at least one processor; and
  at least one memory including computer program code for one or more programs,
  the at least one memory and the computer program code configured to, with the at least one processor, cause the apparatus to perform at least the following:
    detect a content request associated with a user from one or more programs;
    determine one or more processes associated with one or more user interface elements of the one or more programs;
    determine, at another program, to filter the content request;
    determine context information associated with one or more of the user and a device of the user;
    wherein the context information includes data that relates to a location, a time, an activity, and a social graph associated with the user that identifies levels of importance of people to the user;
    filter results of the content request based on the context information;

wherein filtering the results comprises (i) determining each of a plurality of types of relevancy information associated with a result including: level of importance of a person providing the result to the user in the social graph, a background pertinence of the person providing the result in the social graph corresponding to a potential result, ratings of a result point of interest, distance of the result point of interest to a location of the user, time accessibility of the result point of interest, and recentness of update of content associated with the result point of interest, (ii) setting one or more points for each of the plurality of types of relevancy information, and (iii) generating a total point score for the relevancy information associated with said each result based on the set one or more points; and cause a presentation of the results of the content request within the one or more user interface elements based on the filtered results.

7. An apparatus of claim 6, wherein the apparatus is further caused to:

determine the social graph from one or more social networks, one or more contact lists, a communication history, context information, or a combination thereof.

8. An apparatus of claim 6, wherein the one or more programs, the another program, or a combination thereof operate a system level.

9. An apparatus of claim 6, wherein the apparatus is further caused to:

determine one or more unfiltered results; and cause a presentation of the one or more results and the one or more unfiltered results within the one or more user interface elements, wherein the presentation distinguishes the one or more results from the one or more unfiltered results.

10. An apparatus of claim 6, wherein the content request, the one or more programs, the one or more results, or a combination thereof are represented as one or more computation closures, one or more information closures, or a combination thereof.

* * * * *